(12) United States Patent
Valcalda

(10) Patent No.: US 6,585,105 B2
(45) Date of Patent: Jul. 1, 2003

(54) ENDLESS FLEXIBLE BELT CONVEYOR WITH A LEAKTIGHT FLEXIBLE COVER BELT

(76) Inventor: Florent Valcalda, 73, rue Nationale, F-95490 Vaureal (FR)

( * ) Notice: Subject to any disclaimer, the term of this patent is extended or adjusted under 35 U.S.C. 154(b) by 84 days.

(21) Appl. No.: 09/731,573

(22) Filed: Dec. 7, 2000

(65) Prior Publication Data

US 2001/0019010 A1 Sep. 6, 2001

Related U.S. Application Data

(63) Continuation-in-part of application No. PCT/FR00/00844, filed on Apr. 5, 2000.

(30) Foreign Application Priority Data

Apr. 8, 1999 (FR) .............................. 99 04430

(51) Int. Cl.$^7$ ................................ B65G 15/12
(52) U.S. Cl. ................................... 198/626.2
(58) Field of Search ................ 198/626.2, 626.3, 198/626.4

(56) References Cited

U.S. PATENT DOCUMENTS

| | | | | |
|---|---|---|---|---|
| 2,836,285 A | * | 5/1958 | Muller | ............ 198/626.2 |
| 3,586,156 A | * | 6/1971 | Easley, Jr. | ............ 198/570 |
| 3,618,746 A | | 11/1971 | Suloff | |
| 4,915,213 A | | 4/1990 | Loodberg et al. | |
| 4,951,806 A | | 8/1990 | Schwing et al. | |

FOREIGN PATENT DOCUMENTS

| | | |
|---|---|---|
| DE | 1140506 | 11/1962 |
| DE | 2263710 | 7/1974 |
| DE | 4138780 | 6/1992 |
| EP | 0422301 | 4/1991 |
| FR | 2270172 | 12/1975 |
| FR | 2373472 | 7/1978 |
| FR | 2469365 | 5/1981 |
| FR | 2604983 | 4/1998 |
| FR | 2615836 | 12/1998 |
| JP | 10120136 | 12/1998 |
| WO | 9511848 | 5/1995 |

* cited by examiner

Primary Examiner—Joseph A. Dillon
(74) Attorney, Agent, or Firm—Nils H. Ljungman & Associates

(57) ABSTRACT

The invention concerns a conveyor belt (1) operating as a deep semicircular trough provided with a covering belt (2), characterised in that the covering belt (2) is planar in inoperative state, except for its continuous sealing loops (8) and has a width (a) linked to the length (L) of the trough-shaped conveyor belt (1), at the angle ($\delta$) formed by the flexible covering belt (2), relative to the horizontal and to the length (b) of the continuous scaling loop (8), by the relationship $a = L \cos \delta + 2b$, and a sealing device (5) is formed by said longitudinal loop (8), being urged to enclose, by automatic engagement, each of the longitudinal ends (6) of said conveyor belt (1), and the disengagement, in the proximity of the unloading zone ($Z_d$) is obtained by simple release, under the effect of the opening of the trough angle ($\alpha$) and the separation force between said belts (1, 2) without the intervention of any mechanical means.

11 Claims, 3 Drawing Sheets

ENDLESS FLEXIBLE BELT CONVEYOR WITH A LEAKTIGHT FLEXIBLE COVER BELT

CONTINUING APPLICATION DATA

This application is a Continuation-In-Part Application of International Patent Application No. PCT/FR00/00844, filed on Apr. 5, 2000, which claims priority from French Patent Application No. 99/04430, filed on Apr. 8, 1999. International Patent Application No. PCT/FR00/00844 was pending as of the filing date of the above-cited application. The United States was an elected state in International Patent Application No. PCT FR00/00844.

The invention relates to the continuous handling of bulk materials using conveyors fitted with endless flexible belt conveyors. More particularly the invention concerns endless flexible belt conveyors that operate using deep semicircular troughs, said belt conveyors being leaktight to external elements such as rain, wind and pollution to ensure the protection of the transported materials and being capable of enclosing said transported materials, such as salt, powdery products, cement or cereals, to ensure the protection of the sites over which the materials are transported.

At present tubular flexible belt conveyor devices, usually called pipe conveyors or hose conveyors, or mobile sheaths capable of containing and conveying materials are known from among the handling assemblies available intended to provide double leaktightness towards the inside of the endless flexible belt conveyor, on the one hand, and towards the outside, on the other. These type of devices are described in documents WO9511848-A (DUNLOP ENERKA BV and FOERDERANLANGEN MASCHINENBAU GmbH), FR2615836-A (MAREAU), DE2263710(FRENKING and ROSSIG) and U.S. Pat. No. 4,915,213 (AB SCANIANINVENTOR).

These devices present several major drawbacks. Besides the reduction in the sectional capacity of the belt conveyors, and therefore the output they induce, there are difficulties in terms of the means of ensuring effective leaktightness. These difficulties result in runoff water entering the flexible belt conveyors and damaging the transported products with the consequences that this implies when the products are materials that can be affected by water or even humidity, such as cement, cereals, sugar or salt. One of the main problems is a mechanical one relating to the means intended to maintain the endless flexible belt conveyor in a tubular shape, for example in document FR2604983 -A (JAPAN PIPE CONVEYOR), and the means for closing the endless flexible belt conveyor in on itself or closing the flexible cover on the endless flexible belt conveyor near the loading zone and the means for opening said endless flexible belt conveyor near the unloading zone, as disclosed in document EP04223101 (KABUSHIKIKAISHA ISEKIKAIHATSU).

In order to overcome these drawbacks document FR2715538-A (SURRATEAU) proposes sliding said endless flexible bell conveyor on the inner wall of a belt support, that is also tubular, which does not facilitate loading and unloading operations. Another solution is proposed in document FR2615836-A (MAREAU) in which an installation is described that requires not only a guide cable and the endless flexible belt conveyor to be shaped but also grooves and projecting parts that mesh together to close the endless flexible belt conveyor above the cable.

Similarly, document FR270172-A (POIVRE) proposes teeth on the longitudinal edges of the endless flexible belt conveyor to enable them to mesh together, even though the installation described does not require a cable but rollers to shape the endless flexible belt conveyor into a tube.

In order to overcome these drawbacks, particularly to reduce the high maintenance costs resulting from the need to use more or less complex mechanical devices for shaping the pipes or opening and closing the endless flexible belt conveyor, document DE4138780-A (PHOENIX AG) proposes a flexible belt conveyor that uses roller-free device consisting of one or more guide parts, such as belts, plates or rails constituted by anti-friction, polytetrafluorethylene or polyethylene material. Even though the principle is relatively simple this device does not prevent a reduction in the sectional capacity of the flexible belt, and therefore a reduction of the output of the installation, because its pipe-shaped operation does not allow for use of an endless flexible belt conveyor with a deep semicircular trough shape.

Another attempted solution is described in document JP10120136-A (BANDO CHEMICAL INDUSTRY Ltd.) that proposes a covered belt intended to avoid the use of complex mechanical devices to assemble and separate the belt conveyor from its cover belt. In order for this to be achieved it requires a special shape, called a distorted shape, of the cover belt the edges of which are covered with an intermediary belt that is harder than the belt itself. The device also needs air to circulate between the belt conveyor and the cover belt which also requires careful installation of fragile components. In document FR20373472-A the RAYNERI company proposes a device that is also connected to a source of compressed air in order to avoid the materials that are transported in a tube shape from adhering to the surfaces of the belt.

In document U.S. Pat. No. 3,618,746 (GOODYEAR TIRE AND RUBBER COMPANY) a device is described that is doubtless leaktight but that is incapable of operating in the shape of a deep semicircular trough. The same is true for the double-belt devices described in documents DE1140506 (CONTINENTAL GUMMI-WEAKE AG) and U.S. Pat. No. 4,951,806 (SWING).

Besides these drawbacks the above systems are also completely ineffective when the conveyor reaches the maximum degree of slope for the transported material. For this reason, document FR2469365-A (HASHIMOTO) proposes the use of an endless flexible belt conveyor the inner section of which comprises separator parts to prevent the products from sliding when the slope increases. Even though this arrangement may prove useful it has the drawback of requiring the use of special cleated belts that reduce the flexibility, increase the mass and consequently reduce the output of the handling machine.

To date there does not exist therefore a device that meets the double leaktightness criteria, the mechanical requirements of using simple means to facilitate guiding, opening and closing and those of the maximum sectional capacity of the endless flexible belt conveyor operating in the shape of deep semicircular troughs to ensure maximum output.

The technical problem therefore consists in producing a simple, inexpensive continuous handling device comprising an endless flexible belt conveyor that ensures double leaklightness, i.e. that protects the transported material from damage from outside influences, on the one hand, and the environment from pollution caused by the transported materials themselves, on the other. The device should not reduce the sectional capacity, and therefore the output, and should remain usable even when the conveyor reaches its maximum degree of slope for the transported material, i.e. when the endless flexible belt conveyor is required to operate in the shape of a deep semicircular trough without requiring complex, fragile mechanical devices to be installed in order to maintain the shape, opening and closing of said endless flexible belt conveyor.

In order to achieve this the invention consists of an endless flexible belt conveyor that operates in the shape of a deep semicircular trough, provided with a cover belt, which is also flexible, consisting of a light textile support at least one side of which is coated with an elastomer or plastic polymer that, during operation, is held in contact with the carrying side of said endless flexible belt conveyor by pressure rollers, the two said belts moving at the same speed and enclosing the transported material.

The invention is characterized in that, except for the longitudinal edges, said flexible cover belt is flat in the rest position and that its width is related to that of the endless flexible belt conveyor when said conveyor has the shape of a deep semicircular trough, at the angle relative to the horizontal created by said flexible cover belt during operation, and to the length of the continuous leaktight loop that is integrated into each of the longitudinal edges of said flexible cover belt; and in that a leaktight device between said belts is constituted on each of the longitudinal edges of said continuous leaktight loop, the width of the recess of which matches the thickness of the endless flexible bell conveyor that grips each longitudinal edge of said endless flexible belt conveyor by automatically locking near the loading zone; and in that said leaktight device is disconnected near the unloading zone by becoming simply unhooked under the load exerted by the separation between said belts and the trough angle opening without any mechanical operation being required to create said disconnection.

In a preferred embodiment the leaktight device between the flexible cover belt and the endless flexible belt conveyor is characterized in that each continuous leaktight loop is constituted by each longitudinal edge of said flexible cover belt that folds back on itself to enclose the longitudinal edges of said endless flexible belt conveyor.

In another embodiment the leaktight device between the flexible cover belt and the endless flexible belt conveyor is characterized in that each continuous leaktight loop consists of a continuous ridge that is added to each longitudinal edge of said flexible cover belt either by cold or hot bonding or mechanical assembly, said ridge gripping the longitudinal edges of said endless flexible belt conveyor.

In this embodiment each ridge constituting the section of the leaktight device borne by the flexible cover belt either consists of the same polymer material as that which constitutes the coating of said flexible cover belt or of a different polymer material, said polymer material either being an elastomer or plastic.

The invention will be better understood from the following description and drawings in which.

Figure 6:
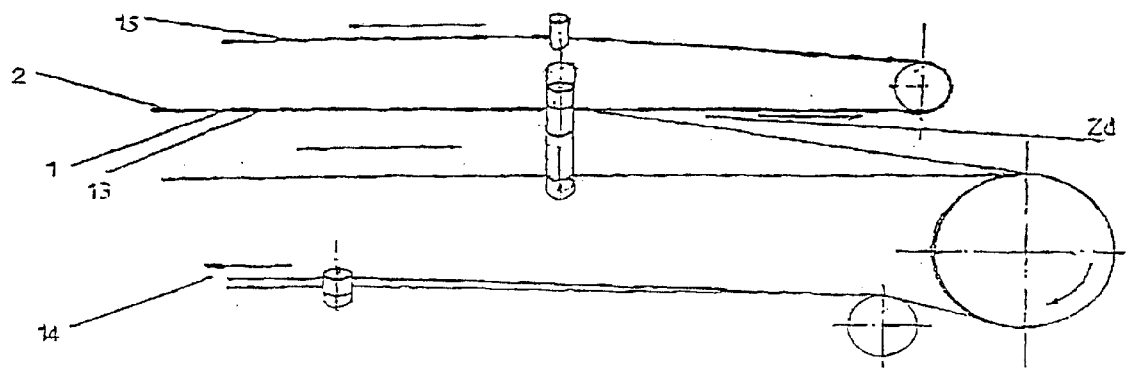
Figure 7:
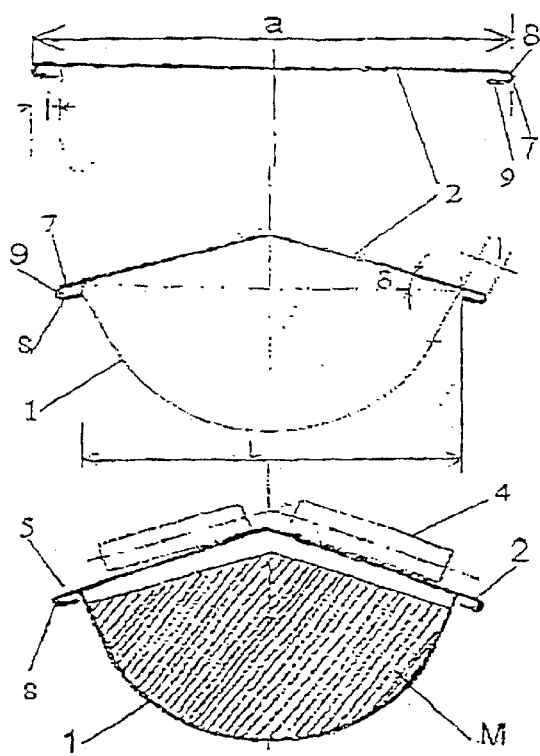

FIG. 6 shows how the continuous leaktight loop borne by the longitudinal edge of the flexible cover belt is disconnected from the longitudinal edges of the endless flexible belt conveyor near the unloading zone or the handling installation by the leaktight device of the invention automatically opening under the separation load exerted between the endless flexible belt conveyor, the flexible cover belt and the trough angle opening;

FIG. 7 shows the calculations of the width of the flexible cover belt relative to the width of the endless flexible belt conveyor in the shape of a deep semicircular trough, the length of the continuous leaktight loops of said flexible cover belt and of the slope angle of said flexible cover belt relative to the horizontal above the transported material.

Figure 1:
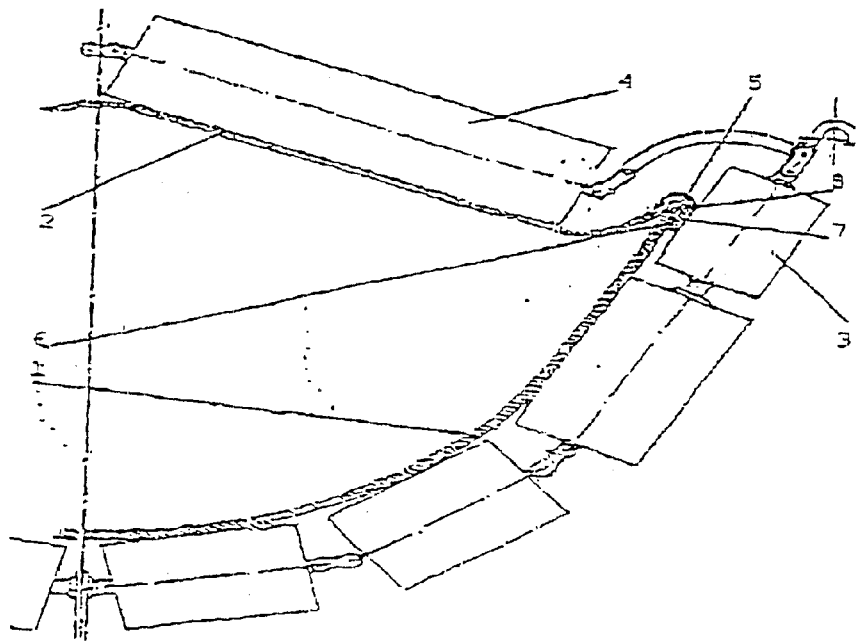
FIG. 1 shows a partial schematic view of the continuous handling installation comprising the endless flexible belt conveyor and the flexible cover belt as well as the leaklight device between said belts.

FIG. 1 shows a schematic partial view of the continuous handling installation comprising the endless flexible belt conveyor (1) in the shape of a deep semicircular trough of angle ($\alpha$) held on support rollers (3) and the flexible cover belt (2), the materials conveyed being inside the conduit thus formed by said belts that move at the same speed. This arrangement enables endless flexible belt conveyor (1) to retain its maximum sectional capacity.

Flexible cover belt (2), that is flat in the rest position except for continuous leaktight loops (8), is applied to the materials transported by pressure rollers (4) which would, however, be insufficient to ensure complete leaktightness.

A leaktight device (5) on each longitudinal edge of said belts is constituted by the continuous leaktight loop (8) borne by the longitudinal edge (7) of flexible cover belt (2) that grips longitudinal edge (6) of endless flexible belt conveyor (1) of width (c) of its recess (9) in order to protect the transported materials against damage from external elements such as wind, rain, hail or snow, on the one hand, and to protect the environment from pollution from the dust or debris from the transported materials, on the other.

Endless flexible belt conveyor (1) is a standard belt the width and resistance qualities of which are suitable for the handling installation, but that does not necessarily require cleats or roughness to retain the materials transported in the conduit formed by said endless flexible belt conveyor (1) and flexible cover belt (2).

Apart from its continuous leaktight loops (8), flexible cover belt (2) is flat in the rest position, which facilitates its manufacture. It generally consists of a light textile support of twisted, woven or any other texture of fabric produced, as a non-limitative example, in polyamide, polyester or a mixture of these textiles, at least one surface of said fabrics being coated with an elastomer-type polymer such as natural or synthetic rubber or a thermoplastic polymer, for example polyvinyl chloride.

The assembly consisting of endless flexible belt conveyor (1) and flexible cover belt (2), that move at the same speed and that are linked via leaktight device (5), is rigid which enables the relative displacements between said belts to be eliminated thus encouraging the longitudinal and transversal centering of said assembly without requiring an additional guide device.

Figures 2, 3:
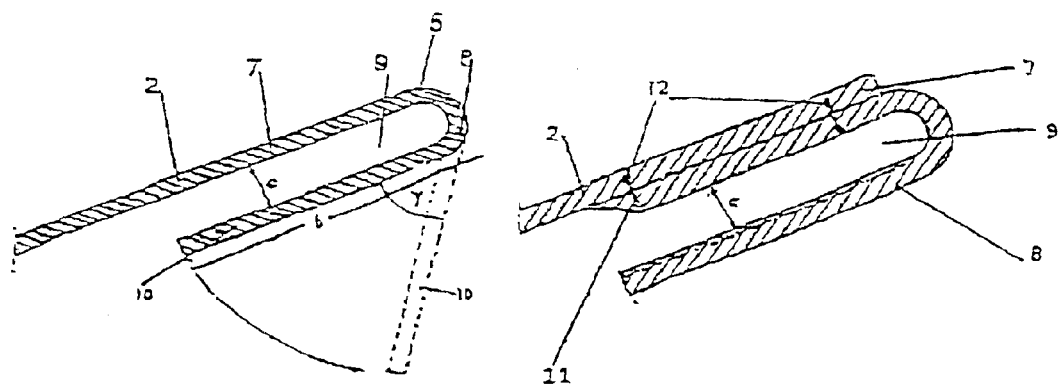
FIG. 2 shows details of an embodiment of a section of the leaktight device between the endless flexible belt conveyor and the flexible cover belt of the invention consisting of a continuous leaktight loop formed by a fold of the longitudinal edge of the flexible cover belt that grips the longitudinal edge of said endless flexible belt conveyor.
FIG. 3 shows another embodiment of the same section of the leaktight device between the endless flexible belt conveyor and the flexible cover belt of the invention, the continuous leaktight loop of which is formed by a continuous ridge added to the longitudinal edge of said flexible cover belt that grips the longitudinal edge of said endless flexible belt conveyor.

FIG. 2 shows details of part of an embodiment of leaktight device (5) between endless flexible belt conveyor (1) and flexible cover belt (2) of the invention, said part consisting of a continuous leaktight loop (8) formed by a fold (10) of longitudinal edge (7) of flexible cover belt (2) that grips longitudinal edge (6) of said endless flexible belt conveyor (1).

Continuous leaktight loop (8) includes a recess (9) the width (c) of which matches thickness (e) of endless flexible belt conveyor (1).

In this embodiment continuous leaktight loop (8) formed by fold (10) of longitudinal edge (7) of flexible cover belt (2) is clearly made of the same polymer or plastic material as that which comprises the coating of flexible cover belt (2). The length (b) of fold (10) of longitudinal edge (7) of flexible cover belt (2) determines, together with width (L) of said endless flexible belt conveyor (1), which has a deep semicircular trough shape, and slope angle ($\delta$) relative to the horizontal position, of said flexible cover belt (2) over transported material (M) the width (a) of flexible cover belt (2).

In this figure dotted lines show the position that fold (10) of longitudinal edge (7) of flexible cover belt (2) takes when leaktight device (5) is opened near unloading zone ($Z_d$) of the handling installation. In the open position said fold (10) of longitudinal edge (7) of flexible cover belt (2) forms an angle ($\gamma$) of approximately 60 degrees with the position it held in the closed position, to form leaktight device (5) with longitudinal edge (6) of endless flexible belt conveyor (1).

FIG. 3 shows another embodiment of a section of leaklight device (5) between endless flexible belt conveyor (1) and flexible cover belt (2) of the invention, an embodiment in which continuous leaktight loop (8) consists of a continuous ridge (11) that is added to longitudinal edge (7) of said flexible cover belt (2) and that grips longitudinal edge (6) of said endless flexible belt conveyor (1). As in the previous embodiment, continuous leaktight loop (8) formed by continuous ridge (11) includes a recess (9) the width (c) of which matches thickness (e) of endless flexible belt conveyor (1).

Continuous ridge (11) opens at the same angle ($\gamma$) as fold (10) of longitudinal edge (7) in the previous embodiment to enable leaktight device (5) to open by separating continuous leaktight loop (8), in this embodiment formed by said continuous ridge (11), from longitudinal edge (6) of endless flexible belt conveyor (1) near unloading zone ($Z_d$) of the handling installation.

Said continuous ridge (11) may consist of the same polymer, elastomer or plastic material as that which constitutes the flexible cover belt but, as it is added, may also, in another embodiment, consist of a different type of polymer material. It can be mounted on longitudinal edge (7) of flexible cover belt (2) using hot or cold bonding or mechanical mounting means, such as rivets or staples.

Figure 4:
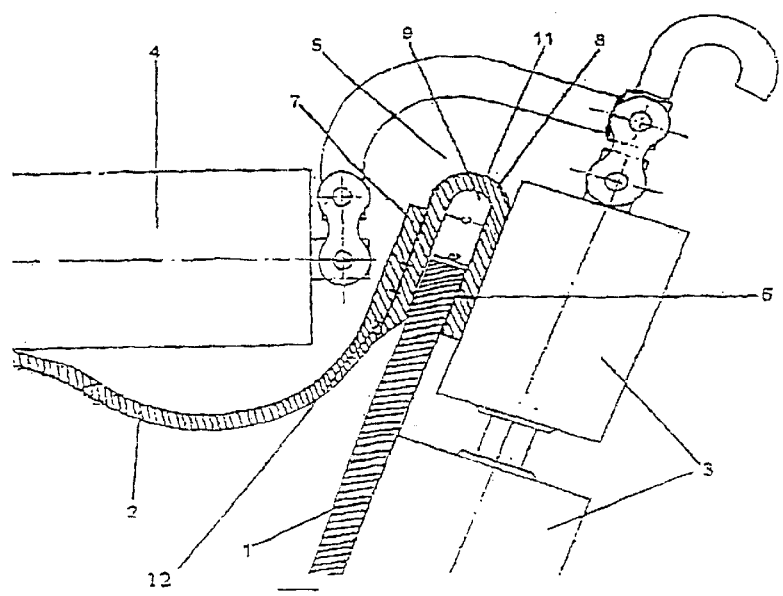
FIG. 4 shows details of a partial view of the leaklight device formed by the automatic locking of the longitudinal edge of the endless flexible belt conveyor in the recess of the continuous leaktight loop borne by the longitudinal edge of the flexible cover belt of the invention near the loading zone of the handling installation.

FIG. 4 shows details of a partial view of leaktight device (5) formed by the automatic locking of longitudinal edge (6) of endless flexible belt conveyor (1), of thickness (e) held by support rollers (3) in recess (9) of width (e) of continuous leaktight loop (8) borne by longitudinal edge (7) of flexible cover belt (2) near loading zone ($Z_c$) of the handling installation. Width (c) of recess (9) of continuous leaktight loop (8) matches thickness (e) of endless flexible belt conveyor (1). Pressure rollers (4) press on flexible cover belt (2) to ensure it is in contact with transported material (M).

In the embodiment shown, continuous leaktight loop (8) consists of a leaktight ridge (11) that is fastened by a mechanical linking device (12) for example stapling, to longitudinal edge (7) of flexible cover belt (2). Said leaktight ridge (11) may consist of the same polymer materials as that which constitutes the coating of flexible cover belt (2) or of another material, also of polymer type, either elastomer or plastic.

Figure 5:
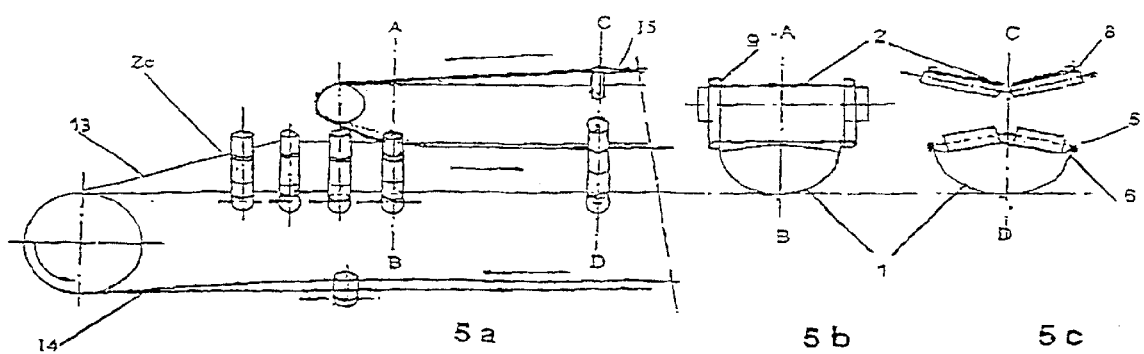
FIG. 5 shows the mechanism for locking the longitudinal edges of the endless flexible belt conveyor into the recesses of the continuous leaktight loops borne by the longitudinal edges or the flexible cover belt to form the continuous leaktight device between said belts.

FIG. 5 shows the locking mechanism of longitudinal edges (6) of endless flexible belt conveyor (1) in recesses (9) of continuous leaktight loops (8) borne by longitudinal edges (7) of flexible cover belt (2) to form continuous leaktight device (5) between the said belts.

In view 5a when carrying side (13) of endless flexible belt conveyor (1) travels near loading zone ($Z_c$) the closing of trough angle ($\alpha$) automatically locks longitudinal edges (6) of endless flexible belt conveyor (1) in continuous leaktight loops (8) borne by longitudinal edges (7) of flexible cover belt (2) to form the continuous leaktight device between said belts.

Before said loading zone ($Z_c$) endless flexible bell conveyor (1) and flexible cover belt (2) are separated, each belt making its return journey: endless flexible belt conveyor (1) via return strap (14) and flexible cover belt (2) via return strap (15). Due to this leaktight device (5) is no longer formed in said return zone of the handling installation.

Cross sections 5b and 5c, that are taken at point AB, on the one hand, and at CD, on the other hand, of view 5a, show the respective positions of endless flexible belt conveyor (1) and flexible cover belt (2) relative to the handling installation zone. In cross section 5b leaktight device (5) cannot be formed as endless flexible belt conveyor (1) and flexible cover belt (2) are not parallel. On the other hand in cross section 5c said belts are in a parallel position and the variation of trough angle ($\alpha$) causes longitudinal edges (6) of endless flexible belt conveyor (1) to be automatically locked in continuous leaktight loops (8) located on longitudinal edges (7) of flexible cover belt (2).

FIG. 6 shows the separation between continuous leaktight loop (8), borne by longitudinal edge (7) of flexible cover belt (2), and longitudinal edges (6) of endless flexible belt conveyor (1) near unloading zone ($Z_d$) of the handling installation by the automatic opening of leaktight device (5) of the invention under the separation load exerted between endless flexible belt conveyor (1) and flexible cover belt (2) and the opening of trough angle ($\alpha$). Before unloading zone ($Z_d$), carrying side (13) of endless flexible belt conveyor (1) and flexible cover belt (2) form a conduit, the cross section of which is virtually trapezoidal, by means of leaktight device (5) that encloses transported material (M).

In unloading zone ($Z_d$) the opening of trough angle ($\alpha$) and the separation load exerted between endless flexible belt conveyor (1) and flexible cover belt (2)—in order for them to make their return journeys, i.e. endless flexible belt conveyor (1) via return strap (14) and flexible cover belt (2) via return strap (15) respectively—automatically causes longitudinal edges (6) of endless flexible belt conveyor (1) to unlock from continuous leaktight loops (8) borne by longitudinal edges (7) of flexible cover belt (2), leaktight device (5) then being no longer formed.

FIG. 7 shows the calculations of width (a) of flexible cover belt (2) between continuous leaktight loops (8) relative to width (L) of endless flexible belt conveyor (1) when it is in the shape of a deep semicircular trough, of length (b) of said continuous leaktight loops (8) and of slope angle (δ) that flexible cover belt (2) forms relative to the horizontal above transported material (M).

Flexible cover belt (2), that is flat in the rest position except for continuous leaktight loops (8), has a length (a) between said continuous leaktight loops (8).

When endless flexible belt conveyor (1) takes the shape of deep semicircular trough of angle (α) the center of flexible cover belt (2) becomes raised and forms a slope of angle (δ) relative to the horizontal that joins continuous leaktight loops (8) above transported material (M). Said flexible cover belt (2) is held in contact with said transported material (M) by means of pressure rollers (4).

It follows that width (a) of flexible cover belt (2) is the same as the product of width (L) of endless flexible belt conveyor (1) when it has a deep semicircular trough shape, i.e. the same as the width of the deep semicircular trough by the cosine of slope angle (δ) relative to the horizontal that flexible cover belt (2) forms increased by twice length (b) of each continuous leaktight loop (8). This calculation may be summarized as follows:

$$a = L \cdot \cos\delta + 2b$$

Endless flexible belt conveyor (1) operating in a deep semicircular trough shape and provided with a flexible cover belt (2) that is also flexible, two said belts moving at the same speed and enclosing transported material (M), according to the invention offers a number of advantages compared to solutions known in the prior art including;

low production costs of flexible cover belt (2) that is flat in the rest position (except folds (10) of its longitudinal edges (7) in one of the embodiments of the invention);

reduced assembly and maintenance costs by eliminating the mechanical parts required in handling installations in the prior art that use tubular belt conveyors;

easy operation that reduces the risks of operating downtime and therefore operating losses due to longitudinal edges (6) of endless flexible belt conveyor (1) that lock automatically in continuous leaktight loops (8) borne by longitudinal edges (7) of flexible cover belt (2) to form leaktight device (5);

longitudinal and transversal centering due to the rigidity of the assembly constituted by endless flexible belt conveyor (1) and flexible cover belt (2) that are connected by leaktight device (5) thus eliminating the need for additional guide means.

To summarize, it is clear that the handling assembly consisting of two belts that operate at the same speed and their leaktight device of the invention resolve the problems of double leaktightness and mechanical simplicity while allowing the endless flexible belt conveyor maximum sectional capacity.

It is clear that those skilled in the art will be able to combine the various embodiments of the handling assembly of the invention or use equivalent means and still remain within the scope of the invention.

What is claimed is:

1. A conveyor belt arrangement for transporting materials, said conveyor belt arrangement comprising:

an endless flexible belt conveyor;

said belt conveyor being configured to be formed into a deep semicircular trough to hold materials to be transported;

a flexible cover belt to cover said trough-shaped belt conveyor to enclose the materials to be transported;

said cover belt consisting of a light textile support;

said cover belt comprising a first side and a second side disposed opposite said first side;

at least one of said first side and said second side of said cover belt being coated with one of an elastomer or a plastic polymer;

a plurality of pressure rollers being configured and disposed to hold said cover belt in contact with said belt conveyor and to move said conveyor belt and said cover belt at the same speed;

said cover belt being flat and having a curved first longitudinal edge and a curved second longitudinal edge;

said cover belt has a width (a), said width being the distance between said curved first longitudinal edge and said curved second longitudinal edge;

said belt conveyor having a first longitudinal edge and a second longitudinal edge;

said belt conveyor defines a distance (L), said distance (L) being the distance from said first longitudinal edge and said second longitudinal edge upon said belt conveyor being in a deep semicircular trough shape;

said cover belt being configured to be bent during operation of said conveyor belt arrangement by said plurality of pressure rollers, such that a portion of said cover belt defines an angle (δ) with respect to a horizontal plane;

said cover belt comprising two continuous leaktight loops, each of which being disposed at a corresponding one of said curved first longitudinal edge and said curved second longitudinal edge;

each of said two leaktight loops has a length (b), which length (b) is the distance from the corresponding curved longitudinal edge of the cover belt to the opposite end of the leaktight loop;

each of said width (a), distance (L), angle (δ), and length (b) being related, during operation of the conveyor belt arrangement, by the following relation: a=L·cos δ+2b;

each of said leaktight loop defining a recess;

each of said recesses having a width;

said belt conveyor having a thickness;

said thickness of said belt conveyor being substantially equal to widths of said recesses of said leaktight loops.

said cover belt and said belt conveyor being configured to engage each other at a material loading zone of said conveyor belt arrangement to permit each of said leaktight loops of said cover belt to grip a corresponding one of said first longitudinal edge and said second longitudinal edge of said belt conveyor to form a leaktight device; and said leaktight device being configured to be disconnected near a material unloading zone of said conveyor belt arrangement by becoming unhooked under the separation load exerted between said cover belt and said belt conveyor without any mechanical operation being required to create said disconnection.

2. The conveyor belt arrangement according to claim 1, wherein each of said continuous leaktight loops is formed by a fold back on itself of each of said longitudinal edges of said flexible cover belt.

3. The conveyor belt arrangement according to claim 1, wherein each of said continuous leaktight loops is formed by a continuous ridge that is added to each of said longitudinal edges of said flexible cover belt.

4. The conveyor belt arrangement according to claim 3, wherein each continuous leaktight loop formed by a continuous ridge comprises one of an elastomer or a plastic polymer, which is the same elastomer or plastic polymer as that of the coating of said flexible cover belt.

5. The conveyor belt arrangement according to claim 3, wherein each continuous leaktight loop formed by a continuous ridge comprises one of an elastomer or a plastic polymer, which is a different elastomer or plastic polymer than that of the coating of said flexible cover belt.

6. The conveyor belt arrangement according to claim 3, wherein each of said continuous ridge of said leaktight loops is added to each of said longitudinal edges of said flexible cover belt by one of cold or hot bonding.

7. The conveyor belt arrangement according to claim 6, wherein each continuous leaktight loop formed by a continuous ridge comprises one of an elastomer or a plastic polymer, which is the same elastomer or plastic polymer as that of the coating of said flexible cover belt.

8. The conveyor belt arrangement according to claim 6, wherein each continuous leaktight loop formed by a continuous ridge comprises one of an elastomer or a plastic polymer, which is a different elastomer or plastic polymer than that of the coating of said flexible cover belt.

9. The conveyor belt arrangement according to claim 3, wherein each of said continuous ridge of said leaktight loops is added to each of said longitudinal edges of said flexible cover belt by mechanical assembly.

10. The conveyor belt arrangement according to claim 9, wherein each continuous leaktight loop formed by a continuous ridge comprises one of an elastomer or a plastic polymer, which is the same elastomer or plastic polymer as that of the coating of said flexible cover belt.

11. The conveyor belt arrangement according to claim 9, wherein each continuous leaktight loop formed by a continuous ridge comprises one of an elastomer or a plastic polymer, which is a different elastomer or plastic polymer than that of the coating of said flexible cover belt.

* * * * *

UNITED STATES PATENT AND TRADEMARK OFFICE
CERTIFICATE OF CORRECTION

PATENT NO. : 6,585,105 B2
DATED : July 1, 2003
INVENTOR(S) : Florent Valcalda

It is certified that error appears in the above-identified patent and that said Letters Patent is hereby corrected as shown below:

Column 3,
Line 25, after "flexible", delete "bell" and insert -- belt --.
Line 58, after the second occurrence of "the", delete "leaklight" and insert -- leaktight --.

Column 5,
Line 38, before "device" delete "light" and insert -- tight --.

Column 6,
Line 10, after "polymer", delete "materials" and insert -- material --.

Signed and Sealed this

Ninth Day of September, 2003

JAMES E. ROGAN
*Director of the United States Patent and Trademark Office*